United States Patent [19]

Chatfield

[11] Patent Number: 4,459,945
[45] Date of Patent: Jul. 17, 1984

[54] CAM CONTROLLED RECIPROCATING PISTON DEVICE

[76] Inventor: Glen F. Chatfield, Sky Oak Dr., Bradfordwoods, Pa. 15015

[21] Appl. No.: 328,233

[22] Filed: Dec. 7, 1981

[51] Int. Cl.³ ............................................. F02B 75/24
[52] U.S. Cl. .................................... 123/56 C; 74/55; 384/125; 123/197 A
[58] Field of Search ............ 123/55 R, 55 A, 55 AA, 123/56 C, 197; 384/125; 74/50, 55

[56] References Cited

U.S. PATENT DOCUMENTS

| | | | |
|---|---|---|---|
| 546,055 | 9/1895 | Pitt | 123/56 C |
| 658,557 | 9/1900 | Pitt | 74/55 |
| 1,107,837 | 8/1914 | Pitt . | |
| 1,718,894 | 6/1929 | Bryant | 74/55 |
| 1,776,843 | 9/1930 | Schafer | 123/43 C |
| 1,780,854 | 11/1930 | Watts et al. | 123/55 AA |
| 3,542,440 | 11/1970 | Brand et al. | 384/125 |
| 3,630,178 | 12/1971 | Erickson | 123/197 R |
| 4,013,048 | 3/1977 | Reitz | 123/197 A |
| 4,072,448 | 2/1978 | Loyd | 123/90.34 |

FOREIGN PATENT DOCUMENTS

| | | |
|---|---|---|
| 2016875 | 4/1972 | Fed. Rep. of Germany . |
| 3115417 | 10/1982 | Fed. Rep. of Germany . |
| 0309334 | 4/1929 | United Kingdom . |
| 0412888 | 7/1934 | United Kingdom . |
| 1015189 | 12/1965 | United Kingdom . |
| 1125263 | 8/1968 | United Kingdom . |
| 1252912 | 11/1971 | United Kingdom . |
| 1486038 | 9/1977 | United Kingdom . |
| 2064050 | 6/1981 | United Kingdom . |

OTHER PUBLICATIONS

Karl-Heinz Küttner; "Kolbenmaschinen"; 1974; pp. 71-72.

Primary Examiner—Craig R. Feinberg
Attorney, Agent, or Firm—Webb, Burden, Robinson & Webb

[57] ABSTRACT

A unique reciprocating piston device that uses one or more special cams and yokes to replace the functions normally provided by crankpins and connecting rods. The cams have noncircular finite jerk lift surfaces which provide continuous positive positioning of the yokes and pistons. Various cams can be configured to overcome the performance limitations imposed by crank and rod controlled pistons for a wide variety of engines and pumps. Preferred embodiments of this invention create a flexible, reliable, efficient and smooth running device for compressing, expanding and transferring fluids. In one specific application, an internal combustion engine is designed such that its pistons spend a greater portion of time near the top and bottom of each stroke than is possible with a crankshaft type engine.

17 Claims, 28 Drawing Figures

CAM CONTROLLED RECIPROCATING PISTON DEVICE

DESCRIPTION

Technical Field

Today nearly everyone is aware that more efficient, inexpensive, non-polluting, multi-fuel engines are desperately needed. A recent major study concludes that reciprocating piston engines have the greatest potential for meeting our automotive power plant needs through the 1980's. In short, gasoline, diesel and stirling piston engines have good part load efficiency which gives them a decided advantage over turbines for use in automobiles. However, to achieve the performance improvements necessary to meet our energy conservation and environmental protection goals we must go back to basics and redesign each type of piston engine, exploiting as much as possible every opportunity to improve performance.

Possibly the most important use of the invention disclosed herein is the improvement of the performance characteristics of various reciprocating piston engines.

In practice, many types of losses reduce the thermal efficiency of piston engines. Time losses are the losses due to piston motion during combustion or heat transfer. Exhaust losses are the losses due to opening the exhaust valve or port before bottom dead center. Heat losses are the losses due to the conduction, convection and radiation of heat from the working gases. Although leakage and incomplete combustion have only minor impact on efficiency, they are a major cause of air pollution and consequently must be very carefully controlled.

Volumetric efficiency is also an important characteristic of piston engines. For example, good high speed volumetric efficiency is necessary to achieve a high power-to-weight ratio from gas, diesel and steam piston engines. Unfortunately, the long valve or port timing required for good high speed volumetric efficiency significantly degrades the low speed performance of these engines. Consequently, engineers who are trying to meet the broad range speed requirements of passenger car engines, are forced to compromise both high and low speed volumetric efficiency in their engine designs.

The crank and rod mechanism used to convert the reciprocating motion of the piston to rotational motion has worked so well for so many years that most designers fail to recognize it as a major obstacle to achieving significant performance improvements. The basic movement of the crank and rod device hinders the designer's efforts to improve both efficiency and performance by decreasing the engine's effective expansion ratio and increasing its time losses, exhaust losses and heat losses. It also forces the unhappy compromise between high and low speed volumetric efficiency.

Consider the kinematics of the crank and rod piston device. The formula for piston position "P" as a function of rotational angle of the crank shaft "$\omega t$" is:

$$P = \frac{S}{2} \cos \omega t + \sqrt{R^2 - \left(\frac{S}{2} \sin \omega t - \phi\right)^2}$$

where "S" is the length of the stroke, "R" is the length of the rod, and $\phi$ is the wrist pin offset. The crank and rod device has the undesirable characteristic of moving the pistons abruptly at both ends of its stroke.

Rapid piston motion near top dead center (TDC) is particularly detrimental. Timing losses, as defined above, are a direct result of TDC motion. Professor Charles F. Taylor, of the Massachusetts Institute of Technology, writes in *The Internal-Combustion Engine in Theory and Practice* (at page 141): "late combustion is responsible for a large part of the difference in output and efficiency between the limited-pressure fuel-air cycle and the actual Diesel cycle." In addition, the volumetric efficiency of crankcase scavenged two-stroke engines is decreased substantially by the very brief time available to draw a full charge while the piston crosses TDC.

Another deficiency of the crank and rod mechanism is that piston acceleration is greatest at TDC. At high rpms, this rapid acceleration of the piston causes the piston's rings to float up in their grooves and lose their sealing ability right at the very instant when cylinder pressures are greatest. The resulting blow-by increases the engine's pollution emissions and, if severe enough, can overheat the piston and cause it to seize within the cylinder.

Rapid piston motion at bottom dead center (BDC) is detrimental to four-stroke internal combustion engine performance in several ways. At the end of the intake stroke the piston does not pause long enough at maximum volume to allow two important functions to take place. First, the cylinder must be completely filled with a new charge; and, second, the intake valve must be completely closed so that the fresh charge is not lost during the beginning of the subsequent compression stroke. To compensate for this problem, designers often time the intake valve to close 60° or more after BDC. While this technique improves high speed efficiency it degrades low speed efficiency. Hence, rapid BDC motion is an obstacle to achieving high volumetric efficiency. The four-stroke engine's piston passes BDC again at the end of the expansion stroke and the beginning of the exhaust stroke. At that time, hot gases should be released to allow cylinder pressure to approach exhaust manifold pressure so that minimal power is lost during the subsequent exhaust stroke. The only way to accomplish this is to open the exhaust valve long before the piston reaches BDC. But opening the exhaust valve early reduces the effectiveness of the expansion stroke and increases exhaust losses which in turn decreases thermal efficiency.

Two-stroke internal combustion engines are hindered even more than four-stroke engines by rapid BDC piston movement. As the two-stroke's piston approaches the bottom of the cylinder, the following sequence of events takes place. First, the exhaust port opens and the hot gases begin to escape. In fact, the exhaust ports should open early enough so that cylinder pressure can blow down to less than transfer pressure before the transfer ports open. Next, the transfer ports open and the fresh charge flows into the cylinder forcing the residual exhaust gases out the exhaust port. Then as the piston moves away from BDC the transfer ports and then the exhaust ports must be closed quickly to capture the fresh charge while the next compression cycle begins. Both the exhaust and intake cycles, which together on four-stroke's consume 360° of rotation, should ideally take place during the brief time that the two-stroke's piston crosses BDC. The result of rapid BDC motion is that two-stroke engines tend to have narrow power-bands. Thus, their use has been limited to special applications such as low-speed diesels and high-speed motorcycles.

The preceding descriptions and analyses make it clear that pistondevice performance could be significantly improved by increasing the percentage of cycle time that the pistons spend near top and bottom dead center. For a given length stroke with crank controlled pistons, rod length and wrist pin offset are the only parameters that the engineer can vary. Unfortunately both parameters only allow very slight changes, and frequently any increase obtained at one end of the stroke causes a decrease at the other end. It seems apparent then, that a different mechanism is needed to achieve a substantial improvement in performance.

In the past several yoke controlled piston devices have been designed to replace the crank and rod. Since none has achieved substantial success, it is worthwhile to take a closer look at them to determine why they have failed to win acceptance.

The oldest and simplest device is the scotch yoke. Neldner used such a mechanism in the internal combustion engine he patented in 1928 (U.S. Pat. No. 1,774,105). This device consists of a crank pin and flat sided yoke whose width is equal to the diameter of the crank pin or the width of the pin bearing, if present. This device moves the pistons with simple harmonic motion which is identical to the motion of a crank with an infinitely long rod. Consequently, the scotch yoke has failed to become popular because its motion is only slightly different from the common crank and rod that it replaces.

Toch and Clark patented a triple camk yoke. (U.S. Pat. No. 1,810,688) While this invention used a three lobe cam designed to give sixstrokes per revolution, it did not serve to increase the time that the pistons spend at top and bottom dead center. The design lacks a means for balancing the reciprocating mass of the yoke assembly. Simple counterweights on the camshaft were ineffective because the yoke reciprocated three times for every revolution of the camshaft. Another drawback of the Toch and Clark design was the use of roller bearing cam followers. As camshaft rpm increases, the acceleration rate of the roller bearings in the follower increases and eventually the rollers begin to slide. This in turn causes excessive wear and poor reliability. Yet another drawback of roller followers is their large pressure angle. This results in excessive side loads on the yoke. In summary, this device lacked piston delay, had bad balance and was subject to the problems of roller type cam followers.

Poage patented an interesting piston and crankshaft connecting means for internal combustion engines. (U.S. Pat. No. 2,513,514) While this device allowed the pistons to dwell at top and bottom dead center, its design was flawed for other reasons. Unlike the scotch yoke, this mechanism depended upon cylinder pressure to keep the yoke in constant contact with the roller crank. Although this condition can be maintained at low operating speeds where the dynamic loads are less than the gas loads, as speed increases the dynamic loads quickly exceed the gas loads. As a result, the Poage invention could only be used for low-speed constant load applications. Here too roller bearing acceleration and jerk would cause wear and reliability problems. And while counterweights would be more effective on the Poage crank than they were on the triple cam, the dwells and eccentric motion of this device would create vibration problems.

DISCLOSURE OF INVENTION

Briefly, according to this invention, there is provided one or more cams on a camshaft associated with one or more yokes, pistons and cylinders. The cylinders are rigidly fixed to the cam case. The camshaft is journaled in the cam case. The axis of the camshaft is essentially perpendicular to the cylinder axes. A piston is arranged to reciprocate in each cylinder. A rod joins each piston to a yoke. Preferably each yoke is shared by two rods and pistons in opposed cylinder relationship. The yokes surround the camshaft and comprise nonroller cam followers or compound nonroller and roller cam followers. Each yoke is positively controlled at all times by one or more noncircular, finite jerk, cam discs that are rigidly attached to the camshaft so that each piston yoke assembly makes two strokes for each revolution of the camshaft.

The term "jerk" as used in this specification and the appended claims is used in the established mechanical engineering sense; that is, to define the third derivative of displacement with respect to time.

By "positive control" is meant that the cam and cam follower surfaces precisely control the position of the yoke at all times. Positive control means that the cam is confined by opposed cam follower surfaces to the following extent: If one surface is in contact with the cam the other surface is no more than the running tolerance (say, about 0.001 to 0.01 of an inch) away from the cam. Of course, there exist an instance during transfer of control from one surface to the other when the cam contacts neither. Both the lift and the return are thus actuated by the cam.

A preferred embodiment of this invention counterbalances the reciprocating mass of two yoke assemblies by operating them 180° out of phase with each other. Other preferred embodiments of this invention, namely the two cylinder opposed and the four cylinder X configurations, are ideally suited for two-stroke engine and pump applicaiton. Still other embodiments incorporate forced cam and follower lubrication systems to increase the load bearing capacity of the mechanism.

It is an object of this invention to create a reciprocating piston device that possesses greater design flexibility than the conventional piston, crank and rod device.

It is another object of this invention to improve the reliability of cam controlled piston devices.

It is still another object of this invention to improve the load bearing characteristics of cam controlled piston devices.

It is yet another object of this invention to improve the reciprocating balance of cam controlled piston devices.

It is another object of this invention to improve the lubrication system for the cam and follower of cam controlled piston devices.

It is still another object of this invention to reduce time losses and increase the effective expansion ratio of both internal and external combustion piston engines.

It is yet another object of this invention to reduce the exhaust losses of various piston engines.

It is another object of this invention to improve the volumetric efficiency of piston devices.

It is still another object of this invention to create a simple, easy to manufacture piston device.

It is yet another object of this invention to reduce piston ring acceleration around top dead center.

It is another object of this invention to improve both the low-speed and high-speed performance characteristics of both two and four stroke spark and compression ignition engines.

It is still another object of this invention to improve combustion and reduce exhaust emissions of internal combustion piston engines.

It is yet another object of this invention to create a piston device that will improve the multi-fuel operating characteristics of piston engines.

It is another object of this invention to create a piston device that will improve the fuel economy of piston engines.

It is yet another object of this invention to create a piston device that can be better adapted to the functional requirement of all Rankine, Otto, Diesel and Stirling engines.

BEST MODE FOR CARRYING OUT THE INVENTION

Figure 1:
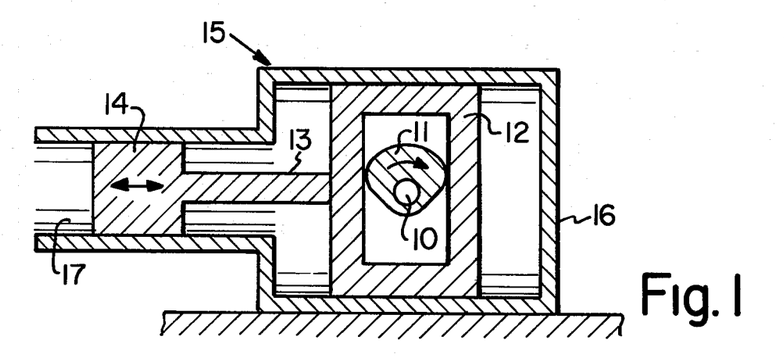
FIG. 1 is a schematic illustration of a single cylinder mechanism according to this invention.

There are two alternative versions of any embodiment of this invention. The first version shown in FIG. 1 is referred to as a rotating cam design. In its simplest form, it comprises two moving parts; namely, a rotating camshaft 10 with one finite jerk constant breadth cam 11 attached to it and a reciprocating yoke 12, rod 13 and piston assembly 14. The moving parts work in conjunction with a stationary block 15 that includes a cam case 16, camshaft bearings and a cylinder 17. The alternative to the rotating cam version is the rotating block version. This mechanism is similar except that the camshaft is held stationary while the block, cylinder, yoke, rod and piston assembly rotate about it. For the sake of simplicity only rotating cam versions will be described throughout the remainder of this disclosure although both versions are contemplated by this invention.

All types of multicylinder configurations such as in-line, vee, opposed, radial, etc. can be constructed. In fact, this invention in one form or another may be used to replace any existing single or multicylinder reciprocating piston mechanism. Two configurations of particular interest will be discussed; namely, the two cylinder opposed and the four cylinder radial T or X configurations.

Figure 2:
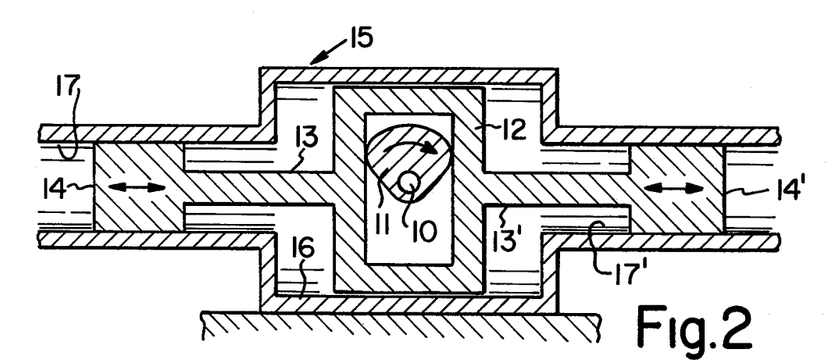
FIG. 2 is a schematic illustration of a two cylinder opposed mechanism according to this invention.

The two cylinder opposed configurations shown in FIG. 2 has several advantages over the single cylinder configuration of FIG. 1. Notice that a second cylinder 17', piston 14' and rod 13' have been added without adding any additional moving parts. The displacement is twice that of the embodiment of FIG. 1 and yet the size and weight is only about 30% greater. Because the cylinders share the same yoke there is no offset between them and hence no hard to balance rocking couple vibration. Observe also that the cylinders are exactly 180° out of phase with one another which is ideal for two cylinder two-stroke operating cycles. Another advantage to this configuration is its constant cam case volume. As one rod and piston reduces the cam case volume the opposing components increase it by exactly the same amount maintaining constant volume. Cam case pumping losses are minimal and there is no need for an elaborate cam case ventilation system. A small filtered breather that can accommodate temperature expansion and contraction is normally adequate. Notice also how the two cylinders locate the yoke in the plane perpendicular to the camshaft's axis and prevent either piston from cocking in its cylinder thus allowing the yoke to reciprocate freely without using the cam case as a guide. Lastly, this configuration gives optimal two cylinder heat dissipation characteristics which are highly desirable for many air-cooled embodiments of the invention. A working model of a two cylinder opposed internal combustion engine using the principles disclosed herein was built by the applicant and is operational to demonstrate many of the objects of this invention. It is described in more detail below.

Figure 3:
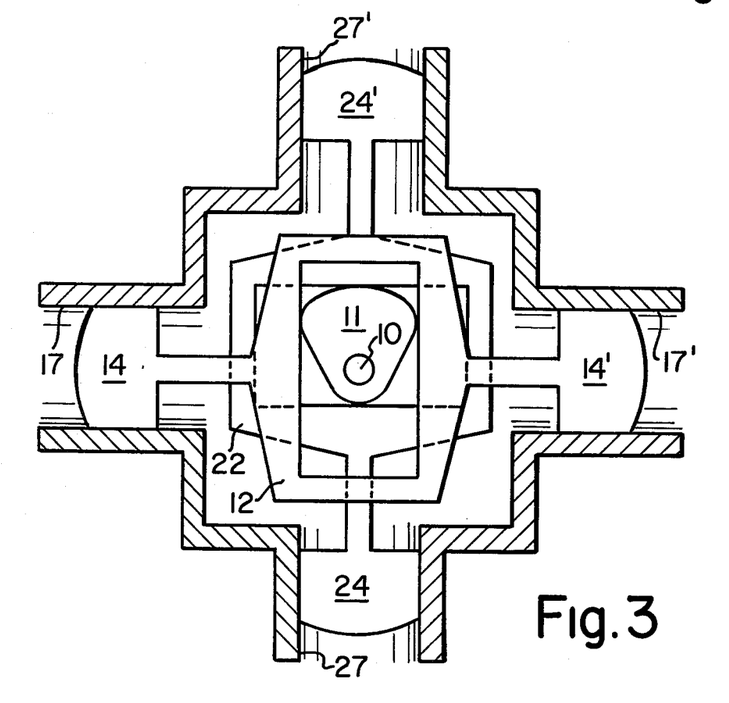
FIG. 3 is a schematic illustrating four cylinder T or X configurations of mechanism according to this invention.

The four cylinder radial T or X configuration shown in FIG. 3 is very attractive for applications that require additional cylinders for more power, greater smoothness, or more compact construction. Placing one more two piston yoke 22 behind the first yoke 12 on the same cam 11, offset by 90° in the plane perpendicular to the camshaft axis, results in a four cylinder mechanism with only three moving parts. Each cylinder 17, 17',27, 27' has exceptional accessibility from all sides facilitating both maintenance and cooling where necessary. Note also, that the operating cycles of the four cylinders are uniformly staggered by 90° which is ideal for four cylinder two-stroke operation.

Figure 4:
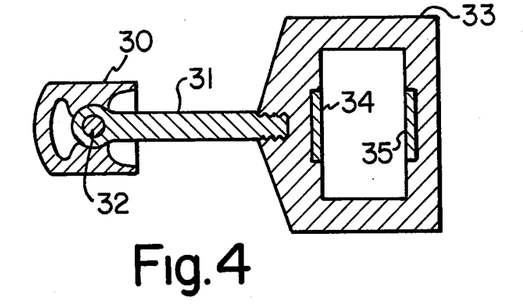
FIG. 4 illustrates a composite yoke assembly according to this invention.

Although is is possible to fabricate the yoke, rod and piston from a single piece of material it is more likely that the designer will favor a composite assembly similar to that shown in FIG. 4. The composite design simplifies various assembly and maintenance procedures and allows each component to be made from the material which is best suited to that component's functional requirements. A composite assembly can also significantly reduce maintenance cost. The assembly shown in FIG. 4 consists of a piston 30 which is attached to a rod 31 by a wrist pin 32. The rod 31 is threadably secured to a yoke 33 which includes two cam follower inserts 34 and 35.

The wrist pin which is essential for crank operated pistons is optional with this invention. It may be desirable to use a wrist pin to take advantage of off-the-shelf pistons or to allow for greater manufacturing tolerances on mass produced units. If, however, the piston will be exposed to significant heat as in an engine, the wrist pin can be eliminated and a radially symmetric piston may be used. The advantage of radial symmetry is that the piston will expand uniformly when heated maintaining its circular shape. Conventional wrist pin pistons lacking radial symmetry must be put through an expensive cam grinding procedure to prevent them from seizing in their cylinders when heated.

In place of a wrist pin, various techniques can be used to attach a piston to the rod, for example, a threaded connection or a ball and socket fastener both of which are radially symmetric. The ball and socket connection can compensate for misalignment and give uniform thermal expansion. Attaching the rod to the center of the piston has the additional advantage of helping to cool the center of the piston. Thus, eliminating the wrist pin reduces the number of moving parts, eliminates the possibility of wrist pin bearing failure, improves piston cooling and allows the piston to be fit tighter inside the cylinder which results in less blow-by, piston noise and wear. In short the piston design flexibility allowed by this invention can be used to substantially improve the performance of piston devices.

Many connecting rod designs for unguided yokes are possible. The rod may be attached to the piston with a wrist pin and threaded into the yoke at the other end. The rod may have a ball and socket piston fastener at one end and to threaded to the yoke at the other end. The rod may have a hollow center to reduce mass and increase rigidity. It may be threaded to both the piston and the yoke. The rod may be tapered for high torque applications that require extra strength where the rod attaches to the yoke. The rod may be attached to both the piston and the yoke by wrist pins having perpendicular axes. While the piston may be free to rotate in the plane perpendicular to the camshaft, the rod to yoke attachment should normally prevent relative motion in that plane unless the yoke itself is kept from turning by some external means such as guides inside the cam case. The mechanism's reliability will normally be improved by designing the rod and yoke to minimize any potential relative rotation between these two components.

Many guided yoke connecting rod designs are possible too. For example, a rod designed with ball and socket fasteners on both ends can be used with a constrained yoke. The rod's freedom to rotate relative to the yoke and piston can be used to compensate for any lack of axial coincidence between the cylinders and the reciprocating yoke.

Constant cross section connecting rods can be supported by reciprocating bearings that are attached to the cam case. This design approach allows the reciprocating bearings and connecting rods, rather than the pistons and cylinders, to counteract cam shaft torque.

Figure 5:
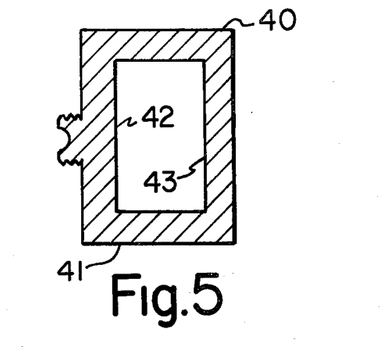
FIG. 5 is a simple yoke shown in section.

The yoke illustrated by FIG. 5 is constructed as a single piece. There is a threaded socket on its left side so that a rod can be attached. The outside surfaces 40, 41 are machined parallel and finished to slide smoothly on cam case yoke guides. The inside bearing surfaces 42, 43 are machined flat and parallel and function as the cam followers.

Figure 6:
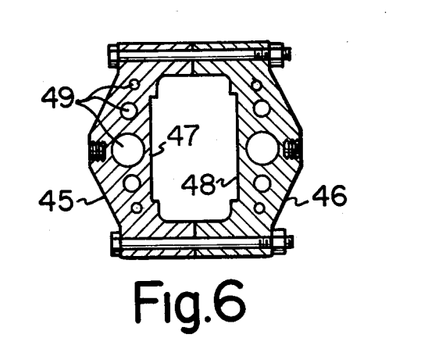
FIG. 6 shows a composite yoke shown in section.

The yoke shown in FIG. 6 is made by bolting two halves 45, 46 together at the top and bottom. This yoke's two-piece construction allows it to be easily removed from the camshaft without removing the camshaft from the cam case. The yoke has recesses 47, 48 for follower inserts on the inside of the yoke and is designed to be used with two opposed rods. The cross section of the vertical sides of the yoke increases towards the center to reduce bending under load. Five holes 49 have been drilled in each yoke half to reduce mass which in turn reduces bearing loads, friction and wear. This yoke is designed to run without cam case guides.

Figure 7:
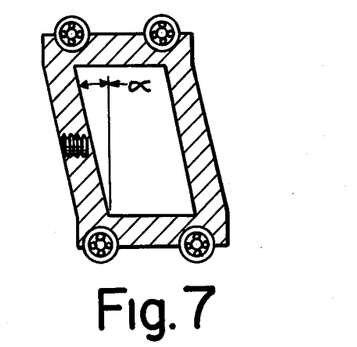
FIG. 7 shows a yoke with slanted follower surfaces.

The yoke shown in FIG. 7 has several interesting features, the most striking of which is its slanted vertical follower surfaces. Throughout this application, the yoke surfaces that bear upon the cam are referred to as cam follower surfaces. The effect of the slant is to increase the stroke of the mechanism by a factor of $$\frac{1}{\sin \alpha}.$$

This yoke illustrates the fact that the followers do not have to be perpendicular to the axis of the connecting rod. This yoke also has roller bearings to ride along the cam case yoke guides.

Figure 8:
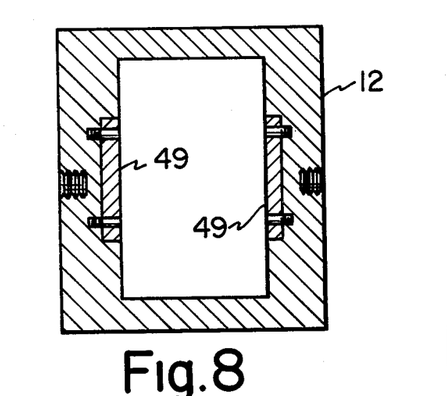
FIG. 8 shows a yoke with inserted cam follower surfaces.

While it is possible to use the inside surfaces of the yoke as the cam followers (or pressers), there are several advantages to having separate follower inserts 49 as shown in FIG. 8. The first advantage of separate follower inserts is that they can be made from special wear resistant materials that would add unwanted reciprocating weight or reduce strength if the entire yoke were made from the follower material. Another advantage is that when the follower surfaces become worn it is much cheaper to replace just the followers than it is to replace the entire yoke.

Figure 9:
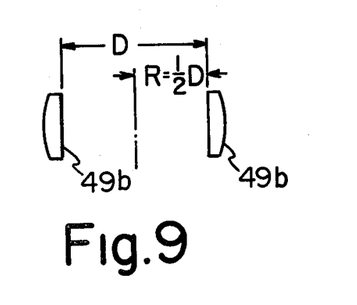
FIG. 9 show self-aligning cam follower inserts.

FIG. 8 illustrates two rectangular flat follower inserts 49 bolted into opposite sides of the yoke. This type of follower is the easiest to make and is adequate for most applications. If however, manufacturing tolerances prevent the follower from contacting the cam face squarely, self-aligning follower inserts like those shown in FIG. 9 can be used. Both the outside surfaces of the follower inserts 49b and the inside surfaces of the yoke are finished with a cylindrical radius (R) equal to ½ the distance (D) between the yoke surfaces. The axis of the follower's cylinder being perpendicular to the plane defined by the axis of the camshaft and the axis of the center of the yoke assembly.

Figure 10:
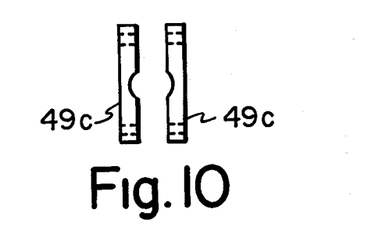
FIG. 10 illustrates cam follower inserts designed to increase load carrying ability.

For high pressure and high speed applications friction and wear can become critical design factors which require special attention. If the cam design includes a dwell at TDC, as it might in compression ignition engines, it may be desirable to increase the contact area between the follower and the cam. The center of the follower insert 49c in FIG. 10 has been given a shallow cylindrical cut. The radius of the cut is equal to the maximum radius of the cam in contact with the yoke at TDC. The larger bearing area provided by the cut increases the load carrying ability of the cam and follower.

Another technique for increasing the cam and yoke's load bearing ability is to remove material from behind the follower insert surface where the maximum forces will be carried. This allows the follower insert to flex in order to conform to the cam surface, thus increasing the contact area and the load carrying ability. For example, for a clockwise rotating two cycle opposed engine where maximum cylinder pressure occurs shortly after TDC, the location of where materials is removed may be offset from the center of the followers.

A two-ply follower insert may be used. The thin inside layer is made of a hard flexible material like steel, and the outside thick layer is made of a softer elastic material that will give under load to allow greater surface contact between the cam and the follower. By combining two or more of the previous load increasing techniques the engineer can design many other reliable high load fixed followers.

Figure 11:
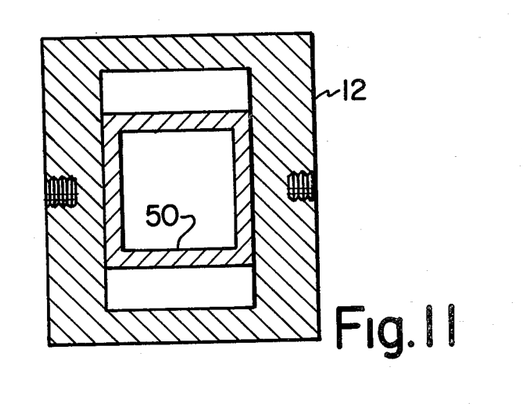
FIG. 11 illustrates a yoke with floating flat follower.

Still another approach to increasing load capacity and reducing wear and friction is the floating flat follower 50 shown in FIG. 11. The floating flat follower 50 is a parallelogram with four equal sides that all maintain contact with the cam. This design causes the follower 50 to slide in the same direction as the lift surface of the cam reducing the relative velocity between the cam and the follower at their point of contact. The floating follower also spreads the wear that occurs during TDC dwell over a significant length of the follower surface, unlike the fixed follower insert that maintains contact at a single point. Floating followers should be made of a material with a thermal expansion rate compatible with both the cam and the yoke so no binding occurs between the follower and either the cam or the yoke as the temperature of the mechanism changes.

Figure 12:
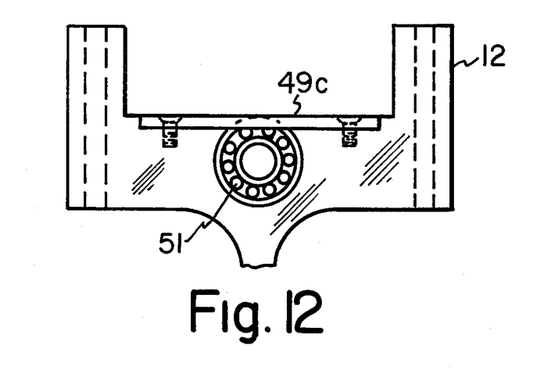
FIG. 12 illustrates a yoke with a flat follower insert and a roller bearing insert.

FIG. 12 illustrates a compound flat 49d and roller bearing 51 follower yoke. Roller bearing followers are commonly used to reduce friction. They work very well in applications where their speed of rotation is reasonably constant during the device's entire operating cycle at a given rpm. If however they are required to accelerate and decelerate significantly during the operating cylce, at high rpm's the inertia of the roller bearing itself will cause it to slide rather than roll over the cam surface. This sliding abruptly increases friction and can easily destroy both the roller bearing and the cam. The design shown in FIG. 12 limits roller acceleration by limiting roller contact to only a small part of the operating cycle.

The roller is mounted at the center of the yoke and the top of its outer cylindrical surface face extends slightly above the flat follower insert surface as shown. The cam is designed to contact the roller only while the yoke is near TDC and to spin freely until that yoke surface approaches TDC again. The BDC surface of the cam must be recessed slightly in the center to prevent it from touching the roller when the yoke is at BDC. Rather than extending the roller and recessing the cam one could choose to recess the roller and extend the roller contact zone of the cam at TDC. Either technique accomplishes the objective of reducing roller acceleration.

Roller contact can be limited to the dwell at TDC or it can be used for a portion of the stroke near TDC. For example, the cam could be designed to contact both flat follower surfaces during 95% of the stroke and contact the roller and its opposite flat follower during 5% of the stroke around TDC. This design would have the benefit of roller contact during the high pressure portion of the cycle while limiting the change in roller velocity to 5%.

The term positive control cam when used in this disclosure does not include the degenerate case of an eccentric circular disc. Since all eccentric circular cams and yokes produce simple harmonic motion, they completely lack the design flexibility which is fundamental to this invention. The circular cam is of interest, however, when establishing a performance base line for evaluating other noncircular cams.

Figure 13:
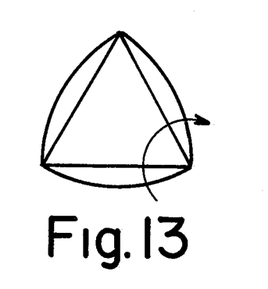
FIG. 13 illustrates a simple noncircular constant breadth cam not according to this invention.
Figure 14:
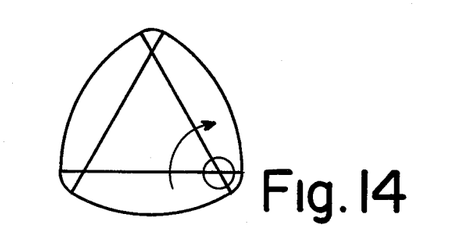
FIG. 14 illustrates a noncircular constant breadth cam not according to this invention wherein the arc radius is greater than the circumscribed equilateral triangle.

The simplest noncircular positive control cam is the constant breadth cam as shown in FIG. 13. It is constructed by drawing circular arcs from the three vertices of an equilateral triangle. In FIG. 13 the arc radius is equal to the length of a side. In a variation shown in FIG. 14, the arc radius is greater than the length of a side. The long arc segments are connected by short circular arcs drawn from the nearest vertex. Although the cam illustrated in FIG. 14 may appear to have a smoother contour than that illustrated in FIG. 13, its motion is identical.

Figure 15:
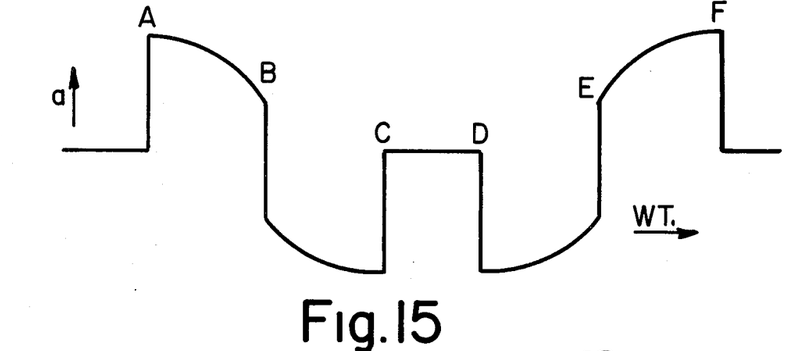
FIG. 15 illustrates acceleration curves for the cams shown in FIGS. 13 and 14.
Figure 16:
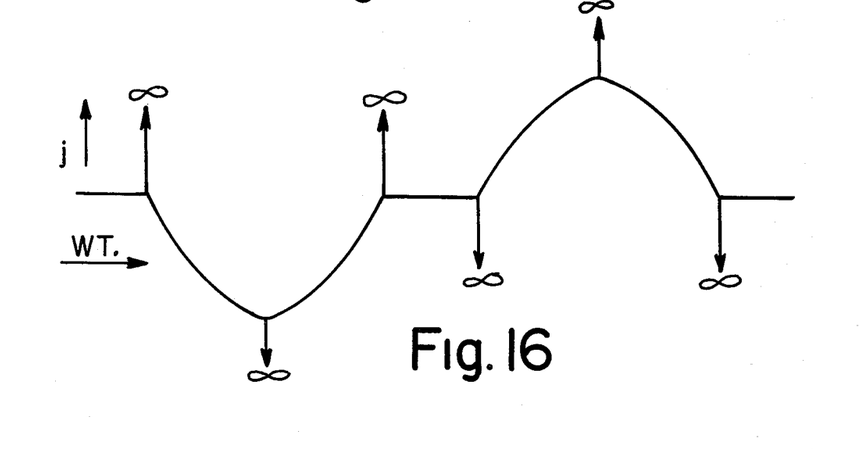
FIG. 16 illustrates the jerk curves for the cams shown in FIGS. 13 and 14.

FIG. 15 shows the acceleration curve by both cams. The horizontal axis represents the angle $\omega t$ and the vertical axis represents acceleration of the yoke along the axis of the piston rod. At points A, B, C, D, E, and F there are discontinuities in the cam's acceleration. Each discontinuity corresponds to a point of infinite jerk as shown in FIG. 16 in which the horizontal axis represents the angle $\omega t$ and the vertical axis represents jerk. The infinite jerk at these points creates a violent pounding action which will ultimately destroy the mechanism at any speed but the very slowest. Thus, because of their inherently poor reliability all infinite jerk cams are unacceptable for use with this invention.

According to this invention, the cams are configured for positive control and include only noncircular, finite jerk cams. The constant breadth cam requires that the first 180° of motion be exactly the opposite of the second 180° of motion which happens to be ideal for opposed cylinder two-stroke devices. Engineering texts such as *Mechanism* by Faires and Keown McGraw-Hill (1960) describe techniques for designing finite jerk constant breadth cams.

Figure 17:
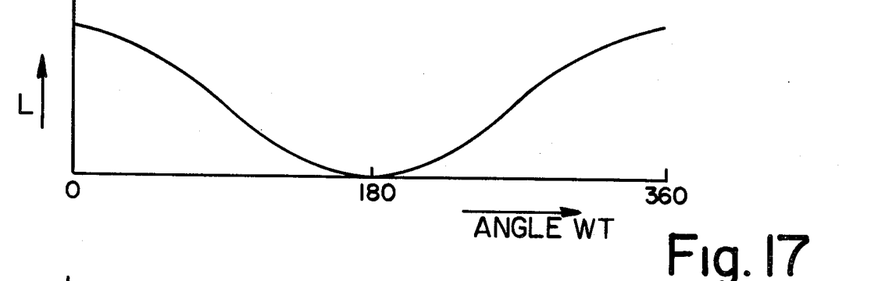
FIGS. 17, 18 and 19 are graphs representing profiles of constant breadth finite jerk cams.

While the actual profile of the cam will be determined by the engineer and the application a closer look at several different constant breadth cam profiles will help one get a better appreciation of this mechanism's design flexibility. Unlike the simple infinite jerk cam in FIG. 14 which has 60° of dwell at TDC and BDC the cam profile graphically illustrated in FIG. 17 has no dwell at all. (FIG. 17 does not show the side view of the cam but graphically illustrates the lift (L) of one follower surface versus angular distance ($\omega t$)). This example illustrates that this invention does not require a dwell and that the engineer can design an infinite variety of nondwell cams.

Figure 18:
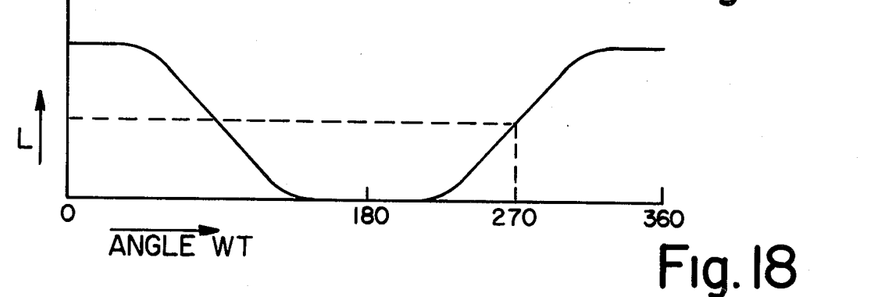

FIG. 18 shows a cam profile with 5° of dwell whose acceleration and deceleration are equal and opposite about the midpoint of the stroke. This profile would be well suited for a pump with double acting pistons or an engine designed to run either clockwise or counterclockwise.

Figure 19:
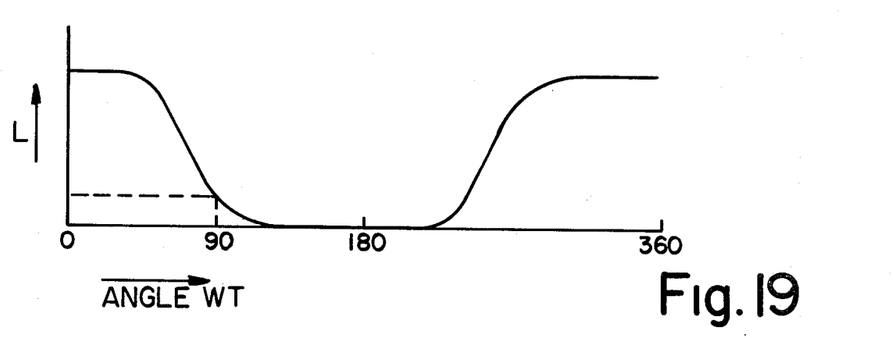

FIG. 19 illustrates a cam profile with 16° of dwell that when turning clockwise decelerates slowly, relatively speaking, as it approaches the dwell at TDC; and accelerates more rapidly, again relatively speaking, as it moves away from TDC. If the same cam turned counterclockwise the yoke would decelerate more rapidly than it would accelerate. This cam illustrates how a designer might control combustion chamber turbulence prior to ignition and accelerate the yoke in unison with the combustion force after ignition to minimize vibration and wear at normal operating speeds. Constant breadth cams with asymmetrical acceleration and deceleration can be designed so that two-stroke cylinder ports are opened slowly and closed quickly to improve the cylinders scavenging efficiency and capture ratio.

If, however, the 180° symmetry constraint of constant breadth cams is undesirable, the engineer can use two or more cam discs to control the yoke.

Figure 20:
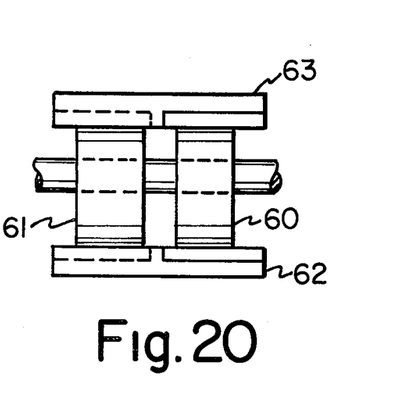
FIGS. 20 and 21 illustrate dual constant breadth cams.
Figure 21:
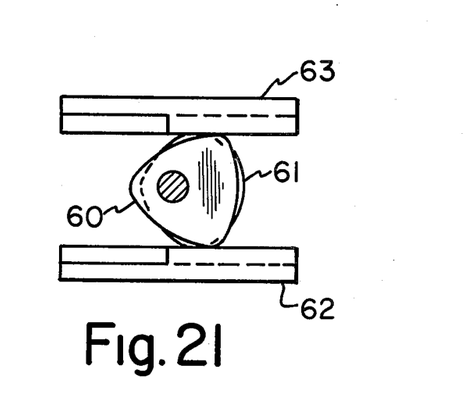

FIGS. 20 and 21 illustrate how two constant breadth cams can be combined to give different lift and return motion. Cam 60 is used to control the lift or first 180° of rotation, and the second cam 61 is used to control the return or second 180° of rotation. The followers 62, 63 are recessed so that the lift cam 60 does not contact the followers during the return 180° and the return cam 61 does not contact the followers during the lift 180°.

Figure 22:
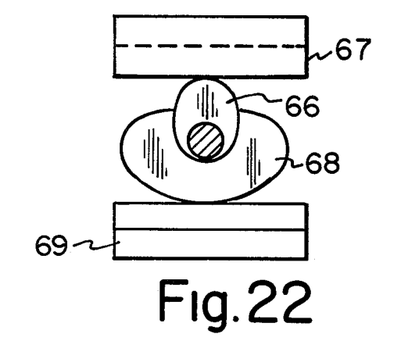
FIGS. 22 and 23 illustrate conjugate cams.
Figure 23:
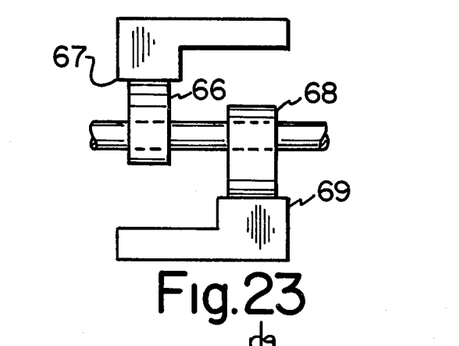

FIGS. 22 and 23 illustrate how conjugate cams can be used to control the yoke during 360° of rotation. Cam 66 maintains contact with follower 67 for 360° while cam 68 maintains contact with follower 69 for 360°. Cams 70 and 71 in FIG. 24 both have the same return profile and show how conjugate cams can be designed without the rocking action that would occur with the cams shown in FIGS. 22 and 23.

It is important to note at this point that the followers do not really have to be flat. With computer assisted design and numerically controlled machine tools it is possible to design and build single and multiple disc positive control cams that work with curved followers. Flat followers merely simplify the manufacturing process.

The irregular motion produced by the cam component of this invention can create a severe reciprocating mass balancing problem. Since the camshaft turns with pure rotary motion, it can be statically and dynamically balanced with simple counterweights. The yoke and piston assembly, however, move with pure reciprocating motion which depending on the application and cam profile may not be satisfactorily balanced by counterweights. In such cases the designer can employ balance yokes which operate out of phase with the piston yokes.

Figures 24, 25, 26, 27, 28:
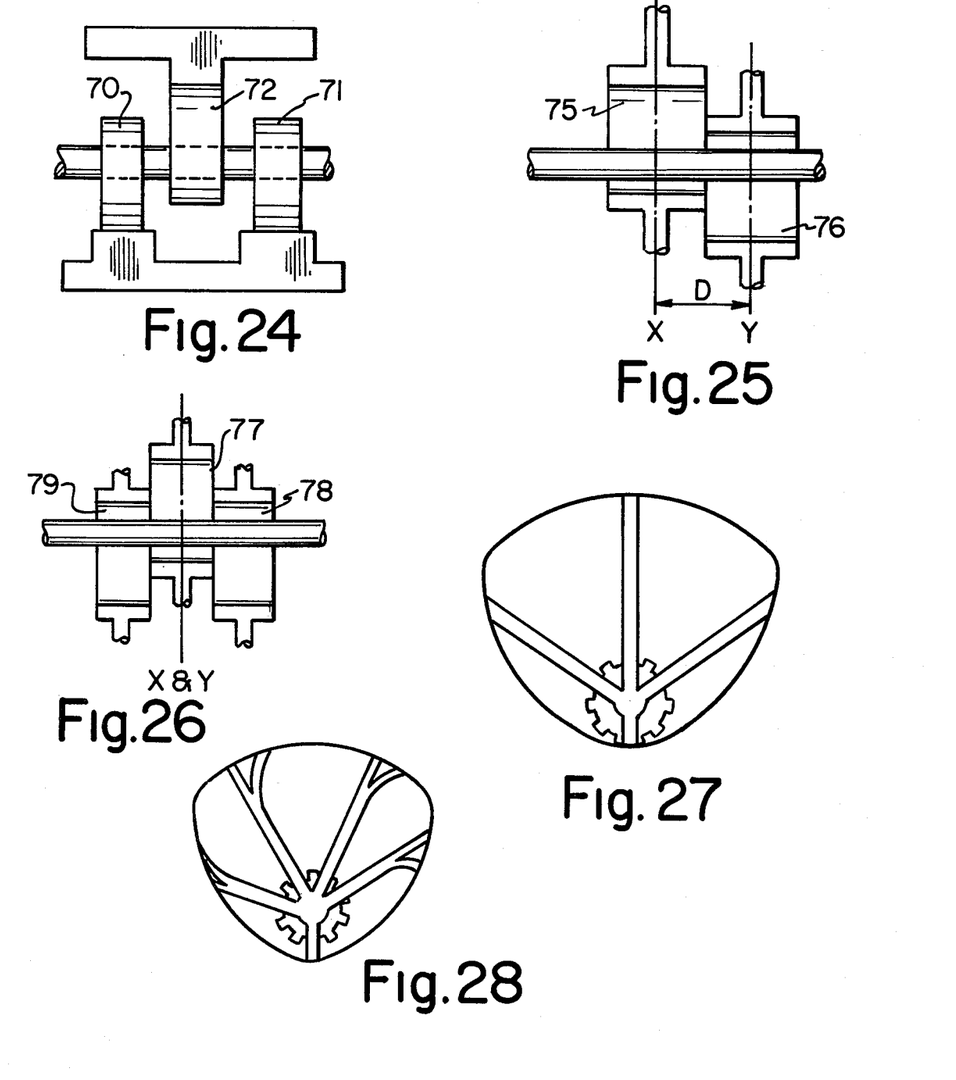
FIG. 24 illustrates zero couple conjugate cams.
FIGS. 25 and 26 illustrate balancing yokes.
FIGS. 27 and 28 illustrate lubricating passages provided in constant breadth cams.

FIG. 25 shows a camshaft with one piston yoke cam 75 and one balance yoke cam 76, which is identical to 75 but rotated 180° on the camshaft. Note that the mass center of the piston yoke falls along the line X and the mass center of the balance yoke falls along the line Y. While this configuration improves reciprocating balance, the offset D between center lines X and Y introduces a small rocking couple. By keeping X and Y as close together as possible the rocking couple can be reduced so that this single balance yoke camshaft design will work well for many applications.

If the designer wants to eliminate the rocking couple, he can employ two balance yoke cams as shown in FIG. 26. By putting exactly half of the mass of the piston yoke 77 on the two balancing yokes controlled by cams 78 and 79, the mass center of the balancing yokes can be made to coincide with the mass center of the piston yoke, thus eliminating the rocking couple.

The techniques shown in FIGS. 25 and 26 can be easily extended to multicylinder configurations. With a well designed balance yoke system, the vibration of even large cam dwell embodiments of the invention, can be reduced to rival the smoothness of pure rotary devices.

Cam surface hardening and lubrication are extremely important to reduce wear. When describing followers above, considerable attention was given to mechanical design techniques for reducing wear. To realize the benefit of those techniques, one must also properly harden the face of the cams and followers and include an adequate cam follower lubrication system.

FIG. 27 illustrates the oil passages of such a lubrication system. Oil enters the cam at the center of its base circle and flows radially outward to the cam face. The cam itself becomes a slinger that throws lubricant onto the cam followers. As rotating speed increases, the volume of lubricant delivered to the follower increases. The cam in FIG. 28 has some of its lubrication paths curved. The curves are intended to better direct the flow of lubricant to the cam and follower where the loads are greatest.

It is also important to understand that the lubricant is a coolant for the cams and followers. The engineer can take greater advantage of this characteristic by adding an oil cooler and increasing the lubricant flow to the cams and followers. The improved cooling that results will increase the load bearing characteristics of the mechanism.

The applicant has actually constructed a working prototype to demonstrate the principals according to this invention.

The prototype is a 110 cc displacement two cylinder opposed two-stroke gasoline engine. The camshaft rotates on roller bearings that are mounted in the cam case. The camshaft has one zero-dwell constant breadth piston cam in the center and one zero-dwell constant breadth balance cam on each side of the piston cam. The balance cams have the same profile as the piston cams but are mounted 180° out of phase with the piston cam. The lift or stroke of all of the cams is 40 mm. Each cam is flanked by circular discs that prevent the yokes from rotating about the axis of their stroke. The cams and followers are lubricated by 15 W40 motor oil that is splashed around the cam case by the circular disc and reciprocating yokes. Aluminum yokes connect to steel rods that pass through oil seals where they exit the cam case. The balance yokes slide in plain bearings mounted in the cam case on the outside of the oil seals. A cylinder adapter is bolted to each side of the cam case so that Yamaha RD60 cylinders can be bolted to each adapter to form the opposed cylinders. Yamaha RD60 pistons are connected by wrist pins to each end of the piston yoke. RD60 cylinder heads are attached to the end of each cylinder. Each cylinder receives its fuel air mixture from a separate 16 mm Mikuni carburetor which is connected to the reed valve inlet at the base of the cylinder by a short intake manifold. A notched pulley on the end of the camshaft enables the engine to be started with a short piece of rope. An electronic tachometer is attached to the engine's ignition system to monitor the camshaft's rotating speed.

The engine starts easily and idles at 1000 RPM. When the throttle is opened the engine accelerates rapidly to beyond 4000 RPM, indicating the presence of substantial torque. The engine is extremely smooth at all speeds belying the fact that there are over eight pounds of reciprocating mass.

By "positive control" is meant that the cam and cam follower surfaces precisely control the position of the yoke at all times. Positive control means that the cam is confined by opposed cam follower surfaces to the following extent: If one surface is in contact with the cam the other surface is no more than the running tolerance (say, about 0.001 to 0.01 of an inch) away from the cam. Of course, there exist an instance during transfer of control from one surface to the other when the cam contacts neither.

Having thus described the invention with the detail and particularly required by the Patent Laws, what is desired protected by Letters Patent is set forth in the following claims.

I claim:

1. In an internal combustion engine the improvement comprising
   at least one cylinder and integral cam case,
   a camshaft,
   camshaft bearings for journaling the shaft in the cam case,
   a reciprocating piston in said at least one cylinder,
   a yoke comprising two cam follower surfaces, and
   a rod joining said piston and yoke
   a cam means comprising at least one noncircular, finite jerk cam mounted upon said camshaft and positioned within said yoke, said cam means configured such that it maintains positive control of the yoke at all times, such that said piston and yoke assembly makes precisely two strokes for each revolution of the camshaft and such that axial motion of the yoke near top and bottom dead center differs from just simple harmonic motion.

2. In an external combustion engine the improvement comprising
   at least one cylinder and integral cam case,
   a camshaft ,
   camshaft bearings for journaling the shaft in the cam case,
   a reciprocating piston in said at least one cylinder,
   a yoke comprising two cam follower surfaces, and
   a rod joining said piston and yoke
   a cam means comprising at least one noncircular, finite jerk cam mounted upon said camshaft and positioned within said yoke, said cam means configured such that it maintains positive control of the yoke at all times, such that said piston and yoke assembly makes precisely two strokes for each revolution of the camshaft and such that axial motion of the yoke near the top and bottom dead center differs from just simple harmonic motion.

3. A reciprocating piston mechanism comprising
   at least one cylinder and integral cam case,
   a camshaft ,
   camshaft bearings for journaling the shaft in the cam case,
   a reciprocating piston in said at least one cylinder,
   a yoke comprising two cam follower surfaces, and
   a rod joining said piston and yoke
   a cam means comprising at least one noncircular, finite jerk cam mounted upon said camshaft and positioned within said yoke, said cam means configured such that it maintains positive control of the yoke at all times, such that said piston and yoke assembly makes precisely two strokes for each revolution of the camshaft and such that axial motion of the yoke near top and bottom dead center differs from just simple harmonic motion.

4. A reciprocating piston mechanism according to claim 3 comprising two opposed cylinders, one yoke and camshaft, two pistons and two rods connecting the pistons to said yoke.

5. A reciprocating piston mechanism according to claim 3 comprising two pairs of opposed cylinders arranged at right angles to each other and axially spaced along the camshaft, two yokes, four pistons and four connecting rods connecting piston pairs to each yoke.

6. A reciprocating piston mechanism according to claim 3 wherein the cam comprises a constant breadth cam.

7. A reciprocating piston mechanism according to claim 3 wherein a floating flat follower is located between the cam and the yoke.

8. A reciprocating piston mechanism according to claim 3 wherein the yoke includes at least one roller bearing cam follower that contacts the cam during only a portion of each revolution of the camshaft.

9. The improvement according to claim 3 wherein the piston dwells at TDC and BDC for between 0 and 60 degrees of camshaft rotation.

10. A reciprocating piston mechanism according to claim 3 comprising a plurality of cylinders, cams, pistons, yokes and rods.

11. A reciprocating piston mechanism according to claim 10 wherein the reciprocating mass of one piston yoke assembly is arranged to counterbalance the reciprocating mass of another piston yoke assembly and wherein the cams of said different yoke assemblies are at different angular orientations.

12. A reciprocating piston mechanism according to claims 3 or 10 further including a counterbalancing reciprocating mass for each yoke assembly controlled by a secondary cam disc on said camshaft, said secondary cam discs being similar to those engaging said primary yoke assemblies with a nonzero angular offset therefrom.

13. A reciprocating piston mechanism according to claims 3 or 10 wherein the cams have passages therein for slinging oil to the cam surfaces.

14. A reciprocating piston mechanism according to claim 3 comprising means for increasing the contact surface between the cam and cam follower surface.

15. A reciprocating piston device according to claim 14 wherein the means for increasing the contact surface comprises a flexible cam follower insert.

16. A reciprocating piston device according to claim 14 wherein the means for increasing contact surface comprises an arcuate surface in the cam follower surface at the location of contact when the piston is at TDC.

17. A reciprocating piston device according to claim 14 wherein the means for increasing surface contact comprise a compressible cam follower insert.

* * * * *